(12) United States Patent
Wong et al.

(10) Patent No.: US 12,309,651 B2
(45) Date of Patent: May 20, 2025

(54) RSS MEASUREMENT IN CASE OF UNKNOWN NUMBER OF CRS PORTS

(71) Applicant: Sony Group Corporation, Tokyo (JP)

(72) Inventors: Shin Horng Wong, Basingstoke (GB); Martin Warwick Beale, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 398 days.

(21) Appl. No.: 17/764,537

(22) PCT Filed: Sep. 22, 2020

(86) PCT No.: PCT/EP2020/076415
§ 371 (c)(1),
(2) Date: Mar. 29, 2022

(87) PCT Pub. No.: WO2021/063748
PCT Pub. Date: Apr. 8, 2021

(65) Prior Publication Data
US 2023/0217328 A1      Jul. 6, 2023

(30) Foreign Application Priority Data
Oct. 4, 2019   (EP) .................................. 19201580

(51) Int. Cl.
*H04W 36/00*     (2009.01)
*H04W 56/00*     (2009.01)

(52) U.S. Cl.
CPC . *H04W 36/0085* (2018.08); *H04W 36/00835* (2018.08); *H04W 56/0015* (2013.01)

(58) Field of Classification Search
CPC ....... H04W 36/00835; H04W 36/0085; H04W 56/0015
See application file for complete search history.

(56) References Cited

U.S. PATENT DOCUMENTS

2019/0229973 A1* 7/2019 Sengupta ............. H04J 11/0079
2022/0141885 A1* 5/2022 Shreevastav ............ H04L 5/006
                                                                370/329

FOREIGN PATENT DOCUMENTS

CA          3088810 A1      7/2019
WO     2013/112829 A1      8/2013

OTHER PUBLICATIONS

International Search Report and Written Opinion mailed on Nov. 9, 2020, received for PCT Application PCT/EP2020/076415, Filed on Sep. 22, 2020, 12 pages.

(Continued)

*Primary Examiner* — Duc C Ho
(74) *Attorney, Agent, or Firm* — XSENSUS, LLP

(57) ABSTRACT

A communications device configured to receive a first re-synchronisation signal, RSS, to receive an indication of a position in time and frequency of an RSS of each of one or more first neighbouring cells, to determine that a number of cell-specific reference signal, CRS, ports of one of the first neighbouring cells is not known by the communications device, to carry out a measurement on the first cell, to carry out a measurement using the RSS of the one of the neighbouring cells, wherein the measurement is carried out using the RSS of the one of the neighbouring cells in accordance with a default number of CRS ports, and to determine, if a trigger condition has not been met, that the one of the first neighbouring cells is not a suitable candidate cell for reselection by the communications device.

20 Claims, 6 Drawing Sheets

(56) References Cited

OTHER PUBLICATIONS

Ericsson et al., "Definition of Measurements for COMP Resource Management", 3GPP TSG-RAN WG1 #69, R1-122841, May 21-30, 2012, 4 pages.
Sony, "Summary on the use of RSS for Measurement Improvements", 3GPP TSG RAN WG1 Meeting #94bis, R1-1811641, Oct. 8-12, 2018, 4 pages.
Ericsson, "Revised WID for Further Enhanced MTC for LTE", 3GPP TSG RAN Meeting #73, RP-161464, Sep. 19-22, 2016, 6 pages.
Huawei et al., "Revised work item proposal: Enhancements of NB-IoT", 3GPP TSG RAN Meeting #73, RP-161901, Sep. 19-22, 2016, 8 pages.
Ericsson et al., "New WID on Even further enhanced MTC for LTE", 3GPP TSG RAN Meeting #75, RP-170732, Mar. 6-9, 2017, 4 pages.
Huawei et al., "New WID on Further NB-IoT enhancements", #3GPP TSG RAN Meeting #75, RP-170852, Mar. 6-9, 2017, 6 pages.
Ericsson, "New WID on Rel-16 MTC enhancements for LTE", 3GPP TSG RAN Meeting #80, RP-181450, Jun. 11-14, 2018, 4 pages.
Ericsson et al., "New WID on Rel-16 enhancements for NB-IoT", 3GPP TSG RAN Meeting #80, RP-181451, Jun. 11-14, 2018, 4 pages.
Holma et al., "LTE for UMTS OFDMA and SC-FDMA Based Radio Access", John Wiley & Sons, 2009, pp. 25-27.
Sierra Wireless et al., "Coverage Analysis of LTE-M Category-M1", White Paper, Version 1.0 2017, pp. 1-20.
3GPP, "Evolved Universal Terrestrial Radio Access (E-UTRA); Physical channels and modulation (Release 15)", 3GPP TS 36.211, V15.6.0, Jun. 2019, pp. 1-239.
3GPP, "Evolved Universal Terrestrial Radio Access (E-UTRA); Physical layer; Measurements (Release 15)", 3GPP TS 36.214, v15.3.0, Sep. 2018, pp. 1-25.
Ericsson, "Use of RSS for measurement improvements in LTE-MTC", 3GPP TSG-RAN WG1 Meeting #98, R1-1908026, Aug. 26-30, 2019, 8 pages.

* cited by examiner

RSS MEASUREMENT IN CASE OF UNKNOWN NUMBER OF CRS PORTS

CROSS-REFERENCE TO RELATED APPLICATIONS

The present application is based on PCT filing PCT/EP2020/076415, filed Sep. 22, 2020, which claims priority to EP 19201580.8, filed Oct. 4, 2019, the entire contents of each are incorporated herein by reference.

BACKGROUND

Field of Disclosure

The present disclosure relates to communications devices configured to synchronise and perform measurements with a wireless communications network in order to transmit or to receive data via the wireless communications networks, and to methods and circuitry of the same.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "The Internet of Things", or IoT for short. The 3GPP has proposed in Release 13 of the 3GPP specifications to develop technologies for supporting narrowband (NB)-IoT and so-called enhanced MTC (eMTC) operation using an LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. The IoT is further enhanced in 3GPP though the introduction of what is referred to here as A-MTC (Additional Machine Type Communications Enhancements) [5] and A-NB-IoT (Additional Enhancement for Narrowband Internet of Things) [6]. At least some devices making use of these technologies are expected to be low complexity and inexpensive devices requiring relatively infrequent communication of relatively low bandwidth data.

The increasing use of different types of communications devices associated with different traffic profiles gives rise to new challenges for efficiently handling communications in wireless telecommunications systems that need to be addressed, particularly, but not exclusively, in respect of low power devices.

SUMMARY OF THE DISCLOSURE

The present disclosure can help address or mitigate at least some of the issues discussed above as defined in the appended claims.

Embodiments of the present technique can provide a communications device configured to transmit data to or receive data from a wireless communications network. The communications device comprises transceiver circuitry configured to transmit signals to and receive signals from the wireless communications network, and controller circuitry configured in combination with the transceiver circuitry to receive a first re-synchronisation signal, RSS, the first RSS being usable by the communications device for acquiring synchronisation and/or performing measurements with a first cell of the wireless communications network, to receive an indication of a position in time and frequency of an RSS of each of one or more first neighbouring cells to the first cell, the RSSs of each of the first neighbouring cells being usable by the communications device for acquiring synchronisation and/or performing measurements with the each of the first neighbouring cells, to determine that a number of cell-specific reference signal, CRS, ports of one of the first neighbouring cells is not known by the communications device, to carry out a measurement on the first cell, to carry out a measurement using the RSS of the one of the neighbouring cells, wherein the measurement is carried out using the RSS of the one of the neighbouring cells in accordance with a default number of CRS ports, and to determine, if a trigger condition has not been met, that the one of the first neighbouring cells is not a suitable candidate cell for reselection by the communications device.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution (LTE) Wireless Communications System

Figure 1:
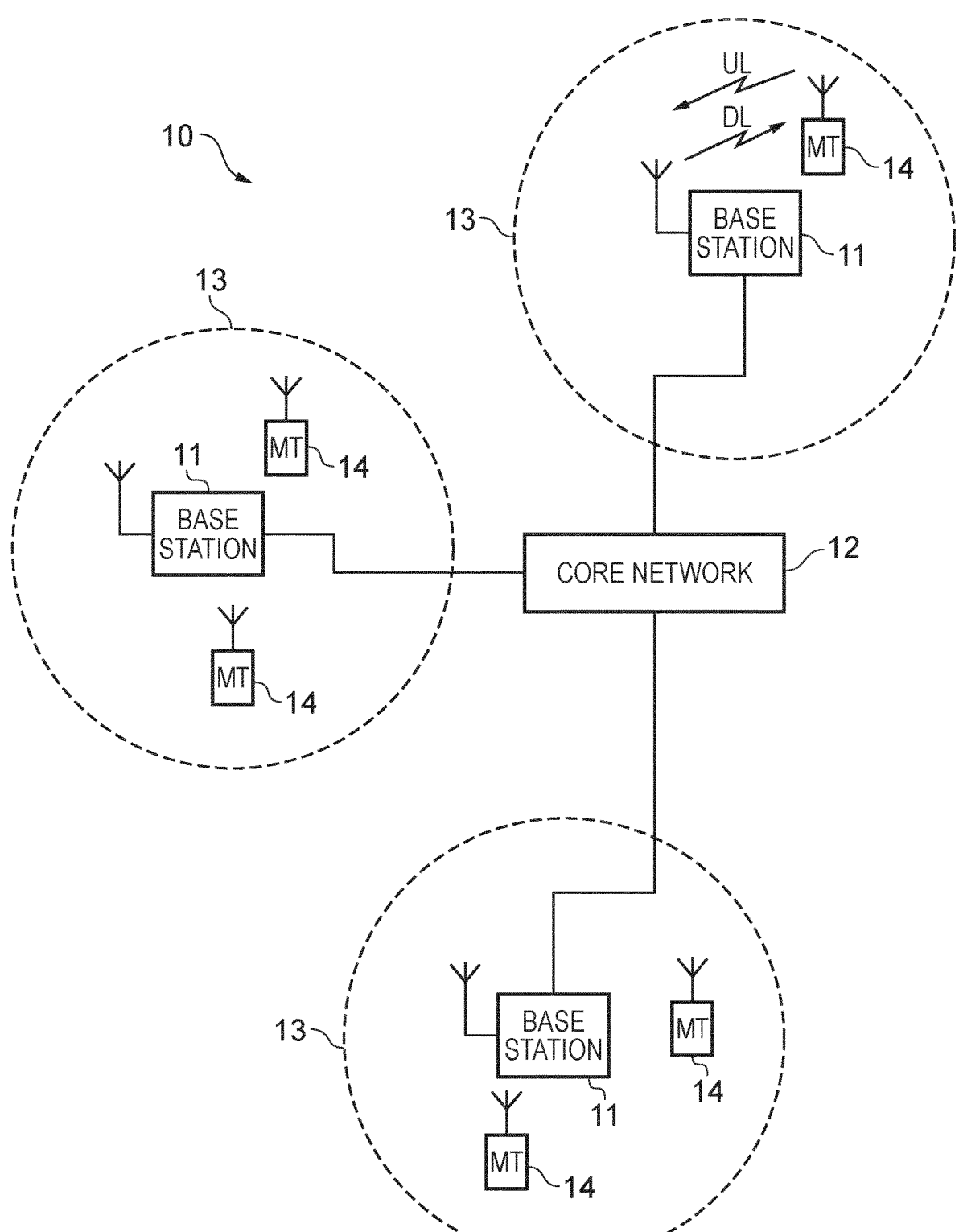
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [7]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present invention can find application with advanced wireless communications systems such as those referred to as 5G or New Radio (NR) Access Technology. The use cases that are considered for NR include:

Enhanced Mobile Broadband (eMBB);
Massive Machine Type Communications (mMTC);
Ultra Reliable & Low Latency Communications (URLLC); and
Enhanced Ultra Reliable & Low Latency Communications (eURLLC).

eMBB services are characterised by high capacity with a requirement to support up to 20 Gb/s. URLLC service requires that a packet at layer 2 is transmitted with a latency that is less than 1 ms or 0.5 ms with reliability of 99.999% to 99.9999%.

The elements of the wireless access network shown in FIG. 1 may be equally applied to a 5G new RAT configuration, except that a change in terminology may be applied as mentioned above.

Figure 2:
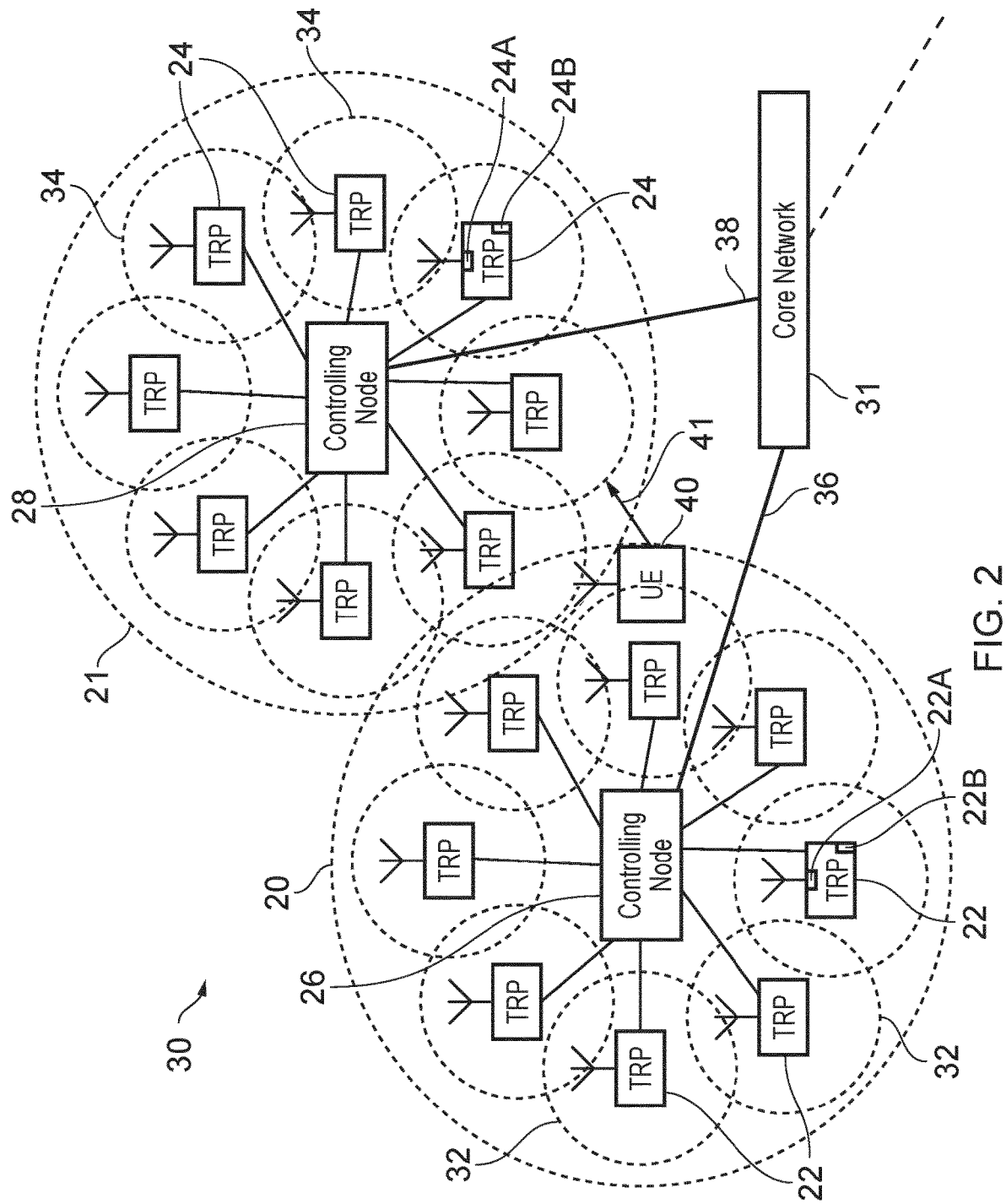
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit, CU) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units (DUs) 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1, and so these terms (as well as indeed eNodeB, eNB, gNodeB, gNB, etc.) are interchangeable. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (DU/TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Before a terminal can use a cell provided by a base station, the terminal is expected to carry out a series of steps. For example, a terminal may be in a situation where it has not yet achieved synchronisation after a long DRX (discontinuous reception) period or after having been switched on. A terminal would be expected to detect the cell and cell-ID using the Primary Synchronisation Signal (PSS) and Secondary Synchronisation Signal (SSS), and then receive the System Information (MIB) from the Physical Broadcast Channel (PBCH) and further System Information from the PDSCH. More specifically a terminal would have to first achieve time and frequency synchronisation with the cell, typically using the legacy primary synchronisation signals (PSS) and secondary synchronisation signals (SSS) emitted by the base station. Then, the terminal will decode the PBCH to acquire the MIB. The MIB contains amongst other things information for the terminal to acquire further System Information, namely SIB1-BR that is transmitted via the PDSCH. SIB1-BR contains scheduling information for acquiring the remaining System Information portions (other SIBs).

As mentioned above, the cell ID is carried by the PSS in combination with the SSS. There are five hundred and four (504) possible cell IDs which are signalled by the PSS and the SSS. These are divided into three groups of one hundred and sixty eight (168) cell IDs. The PSS identifies one of the three groups and the SSS identifies the cell ID of the cell from one of the one hundred and sixty eight cell IDs. Since the PSS is carrying a smaller amount of information the communications resources allocated to the PSS can be more appropriately designed for detection by UEs at lower signal to noise ratios than the SSS. The UE may be therefore more likely to acquire synchronisation with the network.

As described above, it is expected future wireless communications networks will be expected to efficiently support communications with devices including reduced complexity devices or machine type communication (MTC) devices, which may be deployed for supporting the "The Internet of Things", and may typically be associated with the transmissions of relatively small amounts of data with relatively high latency tolerance.

Re-Synchronisation Signals (RSS)

One application of MTC is to provide periodic reports, e.g. for applications including sensors and utility meters, where the reports or readings are transmitted infrequently, e.g. once every several hours or days. Hence in order to save battery power, such devices likely operate mostly in idle mode where they operate with long DRX cycles. When an MTC UE is put into long DRX it will lose synchronisation with the network and hence upon waking up from DRX (e.g. to monitor the Paging Occasion or perform a RACH), the UE needs to re-synchronise to the network and perform system acquisition (read the MIB and SIB). In the legacy system, the UE uses the legacy LTE PSS and SSS to achieve synchronisation and thereafter, the UE acquires the PBCH and then SIB1-BR. For a UE operating in coverage enhanced mode, these re-synchronisation and system acquisition operations are notoriously slow as numerous repetitions are required to be able to decode the PBCH and PDSCH channels carrying the System Information, and hence the UE will consume a lot of battery power. Example estimates of the expected acquisition times for the PSS/SSS, PBCH (MIB) and S1B1 are shown in Table 1, which is reproduced from [8] for a deep coverage scenario. The length of time required to make an accurate measurement of neighbour cell signals depends on the density of those signals. The time required to make an accurate measurement of PSS/SSS is related to the acquisition time shown in Table I. A significant length of time can also be required to measure Reference Signal Received Power (RSRP) using cell-specific reference signals (CRS).

TABLE I

Estimated 90% acquisition time at
164 dB MCL (maximum coupling loss)

| Channel | 90% Acquisition Time (ms) at 164 dB MCL |
|---|---|
| PSS/SSS | 850 |
| PBCH (MIB) | 250 |
| PDSCH (SIB1-BR) | 750 |

Figure 3:
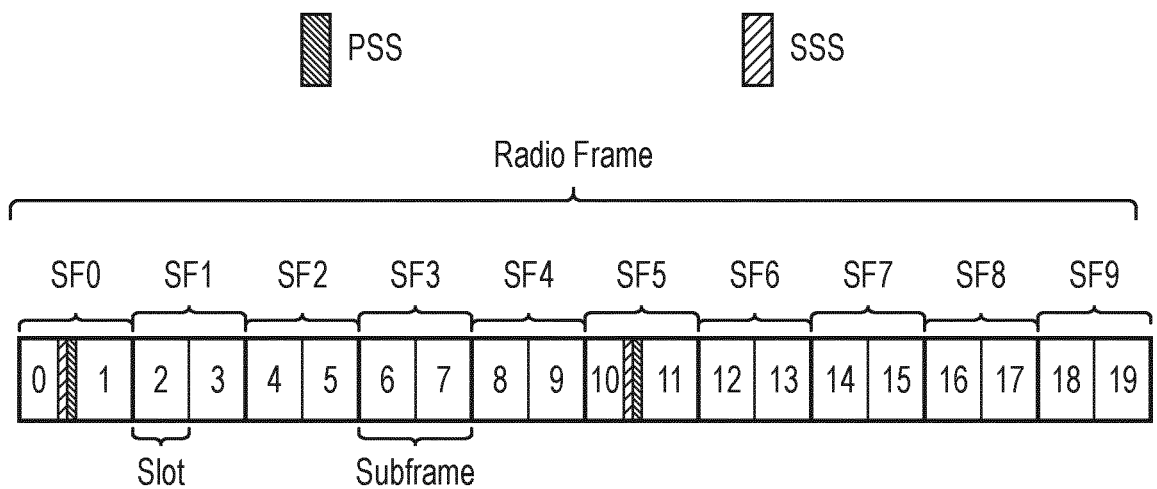
FIG. 3 schematically represents the transmission of the synchronisation signals in an FDD LTE system.

Legacy terminals (MTC terminals or otherwise) use the existing PSS/SSS which occupy only 1 Orthogonal Frequency Division Multiplexed (OFDM) symbol each and are transmitted sparsely; twice every radio frame. This is illustrated in FIG. 3 which represents the transmission of the synchronisation signals in an FDD LTE system, where it can be seen that the PSS and SSS each occupy a single OFDM symbol every 5 ms, where a radio frame is 10 ms. As illustrated by FIG. 3, boxes shown along a horizontal axis represent a transmission of ten subframes SF0 to SF9 in time which form a radio frame. Each of the sub-frames SF0 to SF9 is comprised of two slots as shown for example for one sub-frame SF3. There are therefore twenty slots numbered 0 to 19. As shown in FIG. 3 a PSS is transmitted in the last OFDM symbol of Slot 0 (Subframe 0) and the SSS is transmitted in Slot 10 (Subframe 5). Recognising this, in Rel-15 eMTC additional synchronisation signals known as Re-synchronisation Signals (RSS) were introduced that have longer duration, thereby helping the UE to reduce the time it takes re-synchronise to the network.

Figure 4:
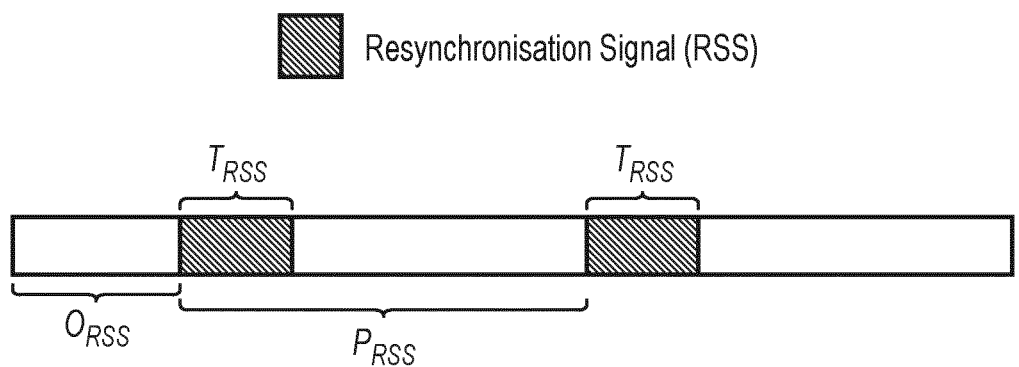
FIG. 4 schematically represents time domain parameters of a Re-synchronisation Signal (RSS)

The RSS is configured in the SIBs, where in the frequency domain it occupies any 2 consecutive PRBs in the system bandwidth. In the time domain it has a duration $T_{RSS}=\{8, 16, 32, 40\}$ ms, a periodicity of $P_{RSS}=\{160, 320, 640, 1280\}$ ms and starts with a time offset $O_{RSS}$ relative to the system frame as shown in FIG. 4.

Cell-Specific Reference Signals (CRS)

Cell-specific Reference Signals (CRS) are transmitted in every subframe in a cell. As mentioned above, they can be used for channel estimation and RSRP or Reference Signal Received Quality (RSRQ) measurements. The CRS sequence is a function of the Physical Cell ID (PCID), and the CRS mapping to the Resource Elements (REs) is also dependent upon the PCID. Hence, if a UE knows the PCID of a cell, the UE is then able to locate and detect that cell's CRS. It should be appreciated by those skilled in the art that RSRP is a type of signal strength measurement which is defined as the linear average over the power contributions of the REs that carry the CRS, while RSRQ is the ratio of RSRP to the Received Signal Strength Indicator (RSSI). The RSSI is the total power received, including interference, from all sources, and is measured on all REs in the OFDM symbols that contain REs for antenna port 0.

Figure 5:
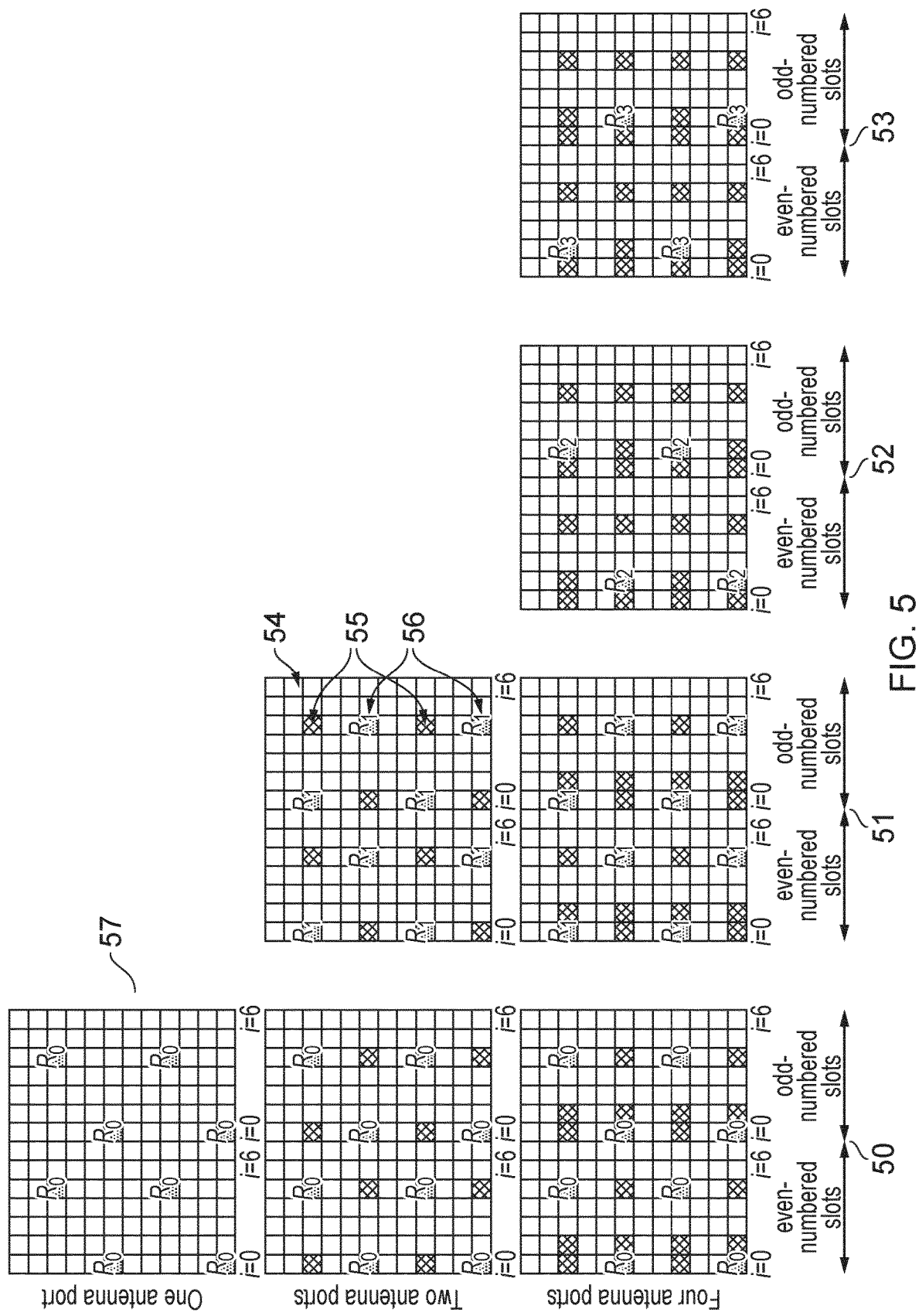
FIG. 5 is reproduced from [9], and illustrates locations of Resource Elements (REs) in a subframe used for transmitting Cell-Specific Reference Signals (CRS) for each antenna port of network infrastructure equipment, which may have one, two or four antenna ports.

The CRS can be transmitted using 1, 2 or 4 antenna ports, where each port is mapped to specific REs in the system bandwidth. FIG. 5 is reproduced from [9], and shows the CRS REs for each antenna port, labelled as $R_0$, $R_1$, $R_2$ and $R_3$ for antenna port 0 1, 2 & 3 respectively for a specific PCID. Antenna ports 0, 1, 2 and 3 are respectively labelled with reference numerals 50, 51, 52 and 53. To illustrate how the CRS can be transmitted using the different antenna ports for infrastructure equipment having different numbers of antenna ports, the REs 54 of a single subframe 57 are shown. Here, REs marked with crosses 55 are those which, though they can be used for transmission of CRS, are not used for transmission on that particular antenna port, while those marked with the notation $R_0$, $R_1$, $R_2$ and $R_3$ 56 are used for transmission of the CRS for the respective antenna ports.

RSRP or RSRQ measurements are made using the CRS where the UE can use only a single CRS port, e.g. $R_0$, to perform these measurements. If the UE can detect the other ports, $R_1$, $R_2$ or $R_3$, then the UE can use these too to provide a more accurate measurement, since more REs are used and thus there is more diversity [10]. The number of REs used and for how long these measurements are made is dependent on the UE's implementation.

Neighbour Cell Measurements Using RSS

A UE performs neighbour cell measurements for handover and cell reselection purposes, i.e. determining whether a neighbour cell is more suitable as a serving cell than the current serving cell. In 3GPP, it is recognised that RSSs can be used for measurement purposes such as RSRP and RSRQ, and would be beneficial for neighbour cell measurements since the RSS REs are denser compared to CRS REs. The UE needs to know the RSS parameters of its neighbour cell in order to use its RSS for measurements. It was previously considered by 3GPP that the neighbour cell RSS parameters could be signalled in the SIBs, and they would consist of:

RSS periodicity {160, 320, 640, 1280} ms: signalled by 2 bits;

RSS duration {8, 16, 32, 40} subframes: signalled by 2 bits;

RSS frequency location: signalled by 7 bits;

RSS time offset in number of radio frames: signalled by 5 bits;

Time offset of RSS in frames. The actual value of time offset is based on the value of periodicity, as follows:

For periodicity 160 ms, only value range 0 to 15 are applicable. Actual value=timeOffset*1 frame;

For periodicity 320 ms, actual value=timeOffset*1 frame;

For periodicity 640 ms, actual value=timeOffset*2 frames; and

For periodicity 1280 ms, actual value=timeOffset*4 frames;

RSS power offset relative to LTE CRS {0, 3, 4.8, 6} dB: signalled by 2 bits; and Number of CRS ports: signalled by 2 bits.

The RSS periodicity, RSS duration, RSS frequency location and RSS time offset tell the UE where the RSS is located in each neighbour cell. The RSS power offset and number of CRS ports tells the UE how to derive the RSRP or RSRQ measurements from the RSS, since these measurements (RSRP, RSRQ) are made with respect to the CRS (e.g. the RSRP indicates the Reference Signal Received Power with respect to the cell-specific reference signals). The RSS measurement gives an RSS signal strength or signal quality, which the UE converts to RSRP or RSRQ, which are based on the CRS. That is, the UE needs to factor in the relative power difference between the RSS and CRS and the number of CRS ports. For example, if the RSS power offset is 3 dB higher than the CRS and there are 2 antenna ports used, then it is expected that the RSS signal strength will be 6 dB higher than the actual RSRP measured using CRS. The terms RSS-RSRP and RSS-RSRQ are used herein to refer to the RSRP and RSRQ measurements derived from RSS measured signal strength and signal quality respectively.

It is observed that the RSS parameters require 20 bits per neighbour cell, which can easily add up to a significant signalling overhead for a large number of neighbour cells. Hence, it is recognised that some overhead reduction in signalling these RSS parameters is beneficial to increase efficiency in time and power consumption. The following have been agreed in 3GPP:

The RSS periodicity is common across all cells in the network, i.e. no signalling bits are required since the UE can obtain this periodicity from its serving cell's RSS parameters (which is signalled in Rel-15); and The two most "expensive" RSS parameters, namely RSS frequency location (7 bits) and RSS time offset (5 bits) are agreed to be a function of the Cell ID.

The RSS duration and RSS power offset are configurable by the network/eNodeB and can also be common across the network, which allows for efficient signalling, e.g. 1 bit to indicate whether it is common or not. Alternatively, if the RSS duration of a particular neighbour cell cannot be signalled to the UE, the UE can assume the smallest duration of 8 subframes, since this will guarantee that the UE would at least receive a subset of the RSS transmission of its neighbour. However, the number of CRS ports cannot be easily made common across the network because the number of CRS ports is associated with the number of antennas at the eNB, and these antennas are physically deployed.

It is also noted in [11] that the existing Neighbour Cell List where these RSS parameters can be signalled is not comprehensive, i.e., it is difficult for the network operator to identify suitable neighbour cells. The UE often detects neighbour cells not listed in the Neighbour Cell List that are suitable candidates for handover or cell reselection. Since detected neighbour cells are not signalled in the Neighbour Cell List, their corresponding RSS parameters are also not known, especially those RSS parameters that cannot be derived (e.g. using Cell ID).

Hence, there is an identified technical problem of how to determine the number of CRS ports of neighbour cells that are not signalled in the Neighbour Cells RSS parameters, which is not otherwise easily determinable at a UE.

CRS Ports for RSRP/RSRQ Measurements Using RSS

Figure 6:
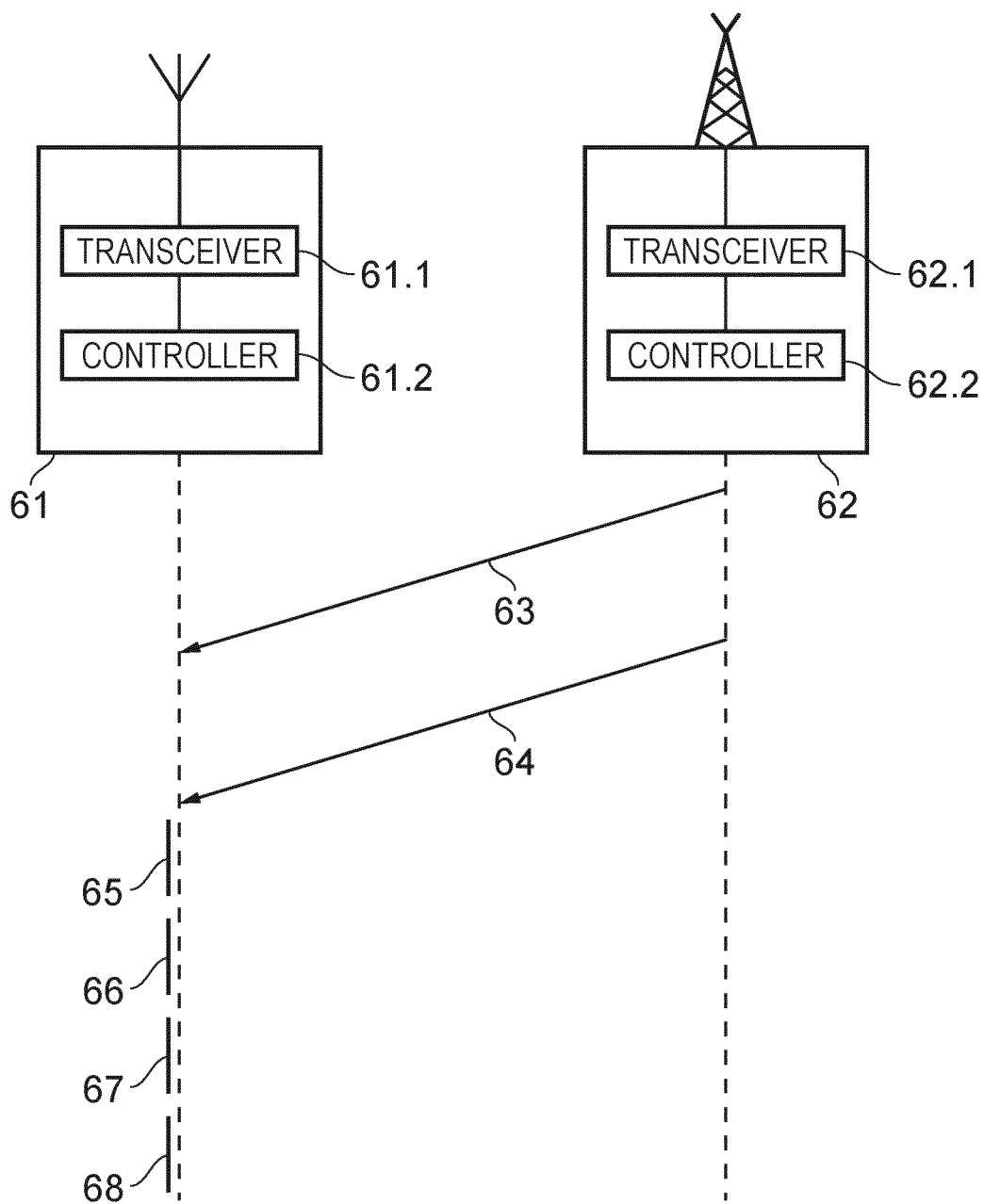
FIG. 6 is a part schematic representation, part message flow diagram of communications between a communications device and an infrastructure equipment of a wireless communications network in accordance with embodiments of the present technique.

FIG. 6 provides a part schematic representation, part message flow diagram of communications between a communications device or UE 61 and an infrastructure equipment or base station/eNodeB/gNodeB 62 forming part of a radio access network of a wireless communications network in accordance with embodiments of the present technique. The communications device 61 comprises a transceiver (or transceiver circuitry) 61.1 configured to transmit signals to the wireless communications network (specifically to the infrastructure equipment 62) via a wireless access interface provided by the wireless communications network, and/or to receive signals from the wireless communications network (specifically from the infrastructure equipment 62) via the wireless access interface, and a controller (or controller circuitry) 61.2 configured to control the transceiver circuitry 61.1 to transmit or to receive the signals. As can be seen in FIG. 6, the infrastructure equipment 62 also comprises a transceiver (or transceiver circuitry) 62.1 configured to transmit signals to the communications device 61 (which may be one of a plurality of communications devices) via the wireless access interface and/or to receive signals from the communications device 61 via the wireless access interface, and a controller (or controller circuitry) 62.2 configured to control the transceiver circuitry 62.1 to transmit or to receive the signals.

Each of the controllers 61.2, 62.2 may be, for example, a microprocessor, a CPU, or a dedicated chipset, etc.

The controller circuitry 61.2 of the communications device 61 is configured in combination with the transceiver circuitry 61.1 of the communications device 61 to receive 63 a first re-synchronisation signal, RSS, the first RSS being usable by the communications device 61 for acquiring synchronisation and/or performing measurements with a first cell of the wireless communications network (where this first cell may be controlled by the infrastructure equipment 62), to receive 64 an indication of a position in time and frequency of an RSS of each of one or more first neighbouring cells to the first cell, the RSSs of each of the first neighbouring cells being usable by the communications device 61 for acquiring synchronisation and/or performing measurements with the each of the first neighbouring cells, to determine 65 that a number of cell-specific reference signal, CRS, ports of one of the first neighbouring cells is not known by the communications device 61, to carry out 66 a measurement on the first cell, to carry out 67 a measurement using the RSS of the one of the neighbouring cells, wherein the measurement is carried out using the RSS of the one of the neighbouring cells in accordance with a default number of CRS ports, and to determine 68, if a trigger condition has not been met, that the one of the first neighbouring cells is not a suitable candidate cell for reselection by the communications device. The person skilled in the art would appreciate that the first cell (which is presently serving the communications device) may not support RSS, while (at least one of) the first neighbouring cells do. In such a case, the communications device would not receive the first RSS, and would only receive the indication of the location of the RSSs for these first neighbouring cells. The skilled person would also appreciate that the term "reselection" used in the description of FIG. 6 and throughout the present disclosure generally refers to reselecting a cell in IDLE mode, reselecting a cell in CONNECTED mode, performing a handover between cells, or in general, performing a mobility procedure between cells.

Essentially, embodiments of the present technique propose that a default number of CRS ports is used for neighbour cells whose RSS parameters are not signalled to the UE (e.g. a detected neighbour cell), until a predefined trigger criterion is met. When this trigger is met, the UE will determine the actual number of CRS ports. There are hence three aspects defined by embodiments of the present technique; the default number of CRS ports, the trigger condition, and how the actual number of CRS ports may be determined.

Those skilled in the art would appreciate that embodiments of the present technique are applicable for the following cases:
Where the number of CRS ports of the neighbour cell is NOT signalled to the UE, which is applicable for detected neighbour cells (i.e. neighbour cells that are not identified in the Neighbour Cell List);
If future 3GPP specifications do not require the signalling of the number of CRS ports for ALL neighbour cells, as is described in [11], for example; and
If the Neighbour Cell List is not configured.

Default Number of CRS Ports

In an arrangement of embodiments of the present technique, the said default number of CRS ports is fixed in the specifications. In other words, the default number of CRS ports is predetermined and known to the communications device. For example, the default number of CRS ports can be fixed to 1. The UE will therefore derive its RSRP from RSS measurements assuming there is only 1 CRS port in each of the detected neighbour cells (i.e. neighbour cells where the number of CRS ports is not signalled).

In another arrangement of embodiments of the present technique, the said default number of CRS ports is signalled to the UE. In other words, the communications device is configured to receive signalling information comprising an indication of the default number of CRS ports. This can be signalled in the SIB. For example, the network can signal a number that is most likely used by most cells in the network, based on the network deployment. This number can also be different for different cells, for example if a serving cell is in a location where it is difficult to deploy a large number of antennas then it can signal, say, 2 CRS ports as the default, whilst in another serving cell in a location where large numbers of antennas can be easily deployed then it can signal 4 CRS ports as the default.

In another arrangement of embodiments of the present technique, the said default number of CRS ports is the same as that of the serving cell. In other words, the default number of CRS ports is equal to a number of CRS ports of the first cell. For example, if the serving cell has 2 CRS ports (which is known to the UE) then the UE can assume that neighbour cells (where the number of CRS ports is not signalled) also have 2 CRS ports. This recognises that if the serving cell is deployed using say 2 CRS ports then it is likely that the same deployment is used for cells around the serving cell.

Trigger Condition

In an arrangement of embodiments of the present technique, the said trigger condition is when the RSS measurement, RSS-RSRP or RSS-RSRQ of the neighbour cell is larger than that of the serving cell by a threshold. In other words, the trigger condition is met when a value derived from the measurement carried out by the communications device using the RSS of the one of the first neighbouring cells is greater than a value derived from the measurement carried out by the communications device on the first cell by greater than a threshold amount. That is:

$$\text{RSS-RSRP}_{Neighbour} - \text{RSRP}_{Serving} > X_{Threshold}; \text{ or}$$

$$\text{RSS-RSRQ}_{Neighbour} - \text{RSRQ}_{Serving} > Y_{Threshold}.$$

Where these thresholds ($X_{Threshold}$ or $Y_{Threshold}$) can be fixed in the specifications or can be RRC signalled (e.g. in the SIB) to the UE. This trigger condition is used to avoid the UE from having to waste battery power trying to determine the actual number of CRS ports. Here, the UE would only determine the actual number of CRS ports for neighbour cells if they appear to be close enough in terms of RSRP that they are a potential target for cell reselection. If the RSRP is substantially less than the RSRP of the serving cell, the detected cell will be unlikely to be a target for cell reselection and there is no point in determining the number of CRS ports on those detected cells. In some implementations of this arrangement, the thresholds $X_{Threshold}$ or $Y_{Threshold}$ are the same as, or derived from, some other cell-reselection parameter. For example, the UE could use the cell-reselection hysteresis parameter as the value of $X_{Threshold}$ or $Y_{Threshold}$. In another example, the UE could use the cell-reselection hysteresis parameter with the addition of 3 dB as the value of $X_{Threshold}$ or $Y_{Threshold}$.

In another arrangement of embodiments of the present technique, the said trigger condition is when the RSS measurement of a neighbour cell is larger than a threshold. In other words, the trigger condition is met when a value derived from the measurement carried out by the communications device using the RSS of the one of the first neighbouring cells is greater than a threshold amount. That is:

$$RSS\text{-}RSRP_{Neighbour} > M_{Threshold}; \text{ or}$$

$$RSS\text{-}RSRQ_{Neighbour} > N_{Threshold}.$$

This arrangement recognises that when the RSS measurement of a neighbour cell becomes significant, then it becomes a candidate for cell reselection and hence a more accurate measurement, i.e. factoring the number of CRS ports, is required. This avoids the UE having to waste battery trying to determine the actual number of CRS ports for neighbour cells that are not potential cell reselection targets. The thresholds ($M_{Threshold}$ & $N_{Threshold}$) can be fixed in the specifications or can be RRC signalled to the UE (e.g. via the SIBs).

In another arrangement of embodiments of the present technique, the said trigger condition is when the RSS measurement of a neighbour cell falls below a threshold. In other words, the trigger condition is met when a value derived from the measurement carried out by the communications device using the RSS of the one of the first neighbouring cells is lower than a threshold amount. That is:

$$RSS\text{-}RSRP_{Neighbour} < S_{Threshold}; \text{ or}$$

$$RSS\text{-}RSRQ_{Neighbour} < T_{Threshold}.$$

The thresholds ($S_{Threshold}$ & $T_{Threshold}$) can be fixed in the specifications or can be RRC signalled to the UE (e.g. via the SIBs). This arrangement recognises that accurate RSRP measurements are only required when the UE is in poor channel conditions. When the UE is in good channel conditions, if it makes a poor measurement of a neighbour cell, that neighbour cell would probably still have sufficiently good channel conditions to maintain a connection. Hence this trigger condition has the effect that only UEs at the cell edge (that need to make accurate RSRP measurements) detect the number of CRS ports of the neighbour cells, so that those UEs can use those detected number of CRS ports to make accurate RSRP measurements.

In another arrangement of embodiments of the present technique, the said trigger condition is when the RSS measurement of the serving cell falls below a threshold. In other words, the trigger condition is met when a value derived from the measurement carried out by the communications device on the first cell is lower than a threshold amount. That is:

$$RSRP_{Serving} < S_{Threshold}; \text{ or}$$

$$RSRQ_{Serving} < T_{Threshold}$$

The thresholds ($S_{Threshold}$ & $T_{Threshold}$) can be fixed in the specifications or RRC signalled to the UE (e.g. via the SIBs). In this arrangement, the UE only makes accurate measurements of neighbour cell RSS-based RSRP if the serving cell RSRP is low enough that the UE might need to re-select to a neighbour cell. This is because if the serving cell's RSRP were higher, then it might not be strictly necessary for the UE to re-select to a neighbour cell, even if the neighbour cell were better, since the high RSRP on the serving cell would allow the UE to maintain the connection with the serving cell.

Determining the Actual Number of CRS Ports

In accordance with arrangements of embodiments of the present technique, if the said trigger condition is met, the UE reselects to the neighbour cell that caused the trigger, and thus is able to determine the number of CRS ports of that neighbouring cell. In other words, the communications device is configured to reselect, if the trigger condition has been met, to the one of the first neighbouring cells such that the communications device receives signals from the one of the first neighbouring cells instead of the first cell, and to determine the number of CRS ports of the one of the first neighbouring cells.

In an arrangement of embodiments of the present technique, the UE then reads the MIB as part of the reselection process and after obtaining the MIB the UE would know the number of CRS ports. In other words, the determining the number of CRS ports of the one of the first neighbouring cells comprises the communications device being configured to determine the number of CRS ports of the one of the first neighbouring cells by reading system information broadcasted by the one of the first neighbouring cells.

Figure 7:
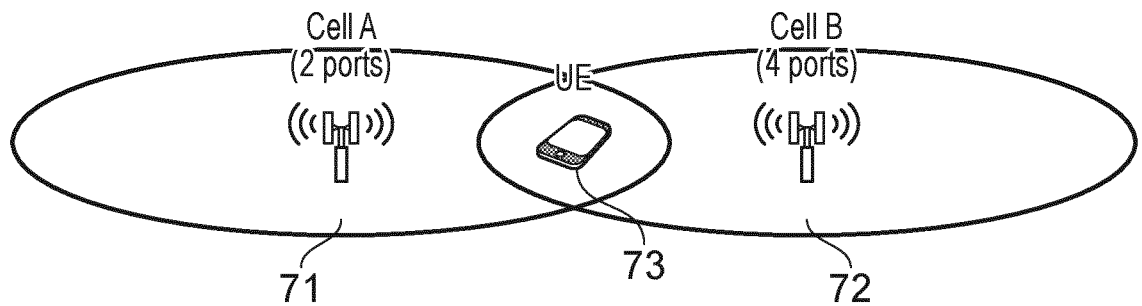
FIG. 7 shows an example of cell reselection being performed by a User Equipment (UE) in order to evaluate the number of CRS ports of a neighbouring cell in accordance with embodiments of the present technique.

In some arrangements of embodiments of the present technique, the UE would also store the number of CRS ports of its previous serving cell and then re-evaluate whether it has made the right cell reselection choice. That is, the UE re-evaluates whether the default number of CRS ports led to a cell reselection to the correct neighbour cell. In other words, the communications device is configured to determine that the trigger condition was met because the default number of CRS ports in accordance with which the measurement was carried out by the communications device using the RSS of the one of the first neighbouring cells is not equal to the number of CRS ports of the one of the neighbouring cells, to determine that a value derived from a second measurement carried out by the communications device using the RSS of the one of the first neighbouring cells and in accordance with the number of CRS ports of the one of the neighbouring cells is lower than a value derived from the measurement carried out by the communications device on the first cell, and to reselect to the first cell such that the communications device receives signals from the first cell instead of the one of the first neighbouring cells. An example is shown in FIG. 7, where:

The default number of CRS ports is the same as that of the serving cell;

The trigger condition is that $RSS\text{-}RSRP_{Neighbour} - RSRP_{Serving} > 3$ dB; and The RSS power offset=0 dBm for all neighbour cells.

The UE 73 is initially connected to Cell A 71 which has 2 CRS ports and a detected neighbour Cell B 72 has 4 CRS ports. The UE 73 is unaware of the number of CRS ports in Cell B 72 and therefore assumes a default number of CRS ports of 2 for Cell B 72. In the example of FIG. 7, the UE 73 makes serving cell measurements using the RSS of Cell A 71, but those skilled in the art would appreciate that similar measurements could be made using CRS from Cell A 71. Similarly, while the example of FIG. 7 describes such measurements s being RSRP measurements, these could in other examples be RSRQ measurements or the like. The RSS measurements are as follows:

RSS signal strength Cell A 71=−98 dBm and factoring in RSS power offset 0 dB and 2 CRS ports give $RSS\text{-}RSRP_{Cell\_A}=-101$ dBm; and RSS signal strength Cell B 72=−94 dBm and factoring in RSS power offset 0 dB and using a default number of CRS ports of 2 give $RSS\text{-}RSRP_{Cell\_B}=-97$ dBm.

This would cause a trigger, since RSS-RSRP$_{Cell\_B}$–RSS-RSRP$_{Cell\_A}$=4 dB which is larger than the threshold of 3 dB. In this example, the UE 73 would reselect to Cell B 72. The UE 73 would then read the MIB and determines that the actual number of CRS ports of Cell B 72 is 4 rather than 2. It will then update its RSS-RSRP$_{Cell\_B}$ to be −100 dBm. The UE 73 would then re-evaluate its cell reselection criteria (which can be different to the said trigger condition). The UE 73 is therefore now aware of the number of CRS ports of Cell B 72 and will use the actual number of CRS ports for Cell B 72 (i.e. 4) rather than the default number of CRS ports (i.e. 2). It should be noted that, in this example, it was confirmed that the neighbour Cell B 72 had a better RSRP than that of the serving Cell A 71. It should also be noted that the UE 73 can store, in its internal memory, the detected number of CRS ports of Cell B 72 and use that detected number of CRS ports for Cell B 72 in future RSS-based RSRP measurements of Cell B 72. The UE can also store the known number of CRS ports for Cell A 71 for future RSS-based RSRP measurements of Cell A 71.

In another arrangement of embodiments of the present technique, if the said trigger condition is met, the UE would measure the RSRP of the neighbour cell that causes the trigger using a legacy method, i.e. based on CRS. The UE would then compare the measurement based on CRS and that based on RSS to determine the difference. If the difference is small, e.g. 1 dB then the UE can assume that the default number of CRS ports used is the same as the actual number of CRS ports. In other words, the determining the number of CRS ports of the one of the first neighbouring cells comprises the communications device being configured to carry out a measurement of a strength of signals received from the one of the first neighbouring cells using a first method, to carry out a measurement of a strength of the signals received from the one of the first neighbouring cells using a second method that is different to the first method, and to determine the number of CRS ports of the one of the first neighbouring cells based on the difference between the strength measured using the first method and the strength measured using the second method. Here, the first method may involve carrying out the measurement on CRS signals received from the one of the first neighbouring cells (or another legacy method) and the second method involves carrying out the measurement using the RSS of the one of the first neighbouring cells.

The same example of FIG. 7 can be used to describe this arrangement, where the Cell A 71 is the UE's 73 serving cell and neighbour Cell B 72 caused a trigger leading to the UE 73 to determine the actual number of CRS ports for Cell B 72. The measurements are:

The default number of CRS ports=2;
RSS-RSRP$_{Cell\_B}$ assuming 2 CRS ports=−95 dBm; and
RSRP$_{Cell\_B}$ measured using legacy method, i.e. based on CRS=−98 dBm.

Since the RSRP of Cell B 72 measured using CRS is 3 dB worse than that using RSS, the UE 73 can then determine that the actual number of CRS ports used for Cell B 72 is twice that of Cell A 71. The UE 73 then updates the number of CRS ports for Cell B 72 to 4.

In some implementations of this arrangement, a threshold can be defined to update the number of CRS ports. For example:

If RSS-RSRP−CRS-RSRP>L$_1$, then double the number of CRS ports. In other words, if the strength measured using the first method is lower than the strength measured using the second method by a third threshold amount, the communications device is configured to determine the number of CRS ports of the one of the first neighbouring cells by doubling the default number of CRS ports;

If RSS-RSRP−CRS-RSRP>L$_2$, then quadruple the number of CRS ports. In other words, if the strength measured using the first method is lower than the strength measured using the second method by a fourth threshold amount, the fourth threshold amount being greater than the third threshold amount, the communications device is configured to determine the number of CRS ports of the one of the first neighbouring cells by quadrupling the default number of CRS ports;

If CRS-RSRP−RSS-RSRP>L$_3$, then halve the number of CRS ports. In other words, the strength measured using the first method is greater than the strength measured using the second method by a first threshold amount, the communications device is configured to determine the number of CRS ports of the one of the first neighbouring cells by halving the default number of CRS ports;

If CRS-RSRP−RSS-RSRP>L$_4$, then divide the number of CRS ports by 4. In other words, if the strength measured using the first method is greater than the strength measured using the second method by a second threshold amount, the second threshold amount being greater than the first threshold amount, the communications device is configured to determine the number of CRS ports of the one of the first neighbouring cells by quartering the default number of CRS ports; and If |CRS-RSRP−RSS-RSRP|<L$_5$, then do not change the number of CRS ports. It will be appreciated by those skilled in the art that |.| signifies the absolute function. In other words, if the difference between the strength measured using the first method and the strength measured using the second method is below a fifth threshold amount, the communications device is configured to determine that the number of CRS ports of the one of the first neighbouring cells is equal to the default number of CRS ports.

In another arrangement of embodiments of the present technique, if the trigger condition is met, the UE would detect the number of CRS ports of the neighbouring cell that causes the trigger. In other words, the determining the number of CRS ports of the one of the first neighbouring cells comprises the communications device being configured to detect CRS signals received from the one of the first neighbouring cells, each of the CRS signals being associated with one of the CRS ports. As described previously herein, the UE is aware of the RE mapping of the CRS and so the UE can attempt to detect the presence of R$_1$, R$_2$ and R$_3$ (see FIG. 5) to determine if ports 1, 2 and 3 exist. If R$_1$ exists but R$_2$ and R$_3$ do not exist then the UE knows that the neighbour cell has only 2 CRS ports. The presence detection of CRS ports can be done, for example, by correlating the received samples of CRS with a known CRS sequence. If a good correlation is obtained, the UE can assume that the associated antenna port is active.

It should be appreciated that, depending on UE implementation, the UE may detect the presence of each of the CRS ports when it measures the neighbour RSRP using CRS. Thus, the above two described arrangements can be combined. That is, when the UE measures the neighbour RSRP using CRS of the neighbour, it will also determine the actual number of CRS ports as part of its implementation and therefore automatically gets the actual number of CRS ports in addition to the CRS-RSRP.

In the arrangements above, it has been described that the UE transfers back to the previous serving cell if it determines that the cell re-selection was based on an incorrect assumption on the number of CRS ports of the neighbour cell. In other arrangements of embodiments of the present technique, a hysteresis value is applied to the "transfer back" process. In other words, the communications device is configured to reselect to the first cell only if the value derived from the second measurement carried out by the communications device using the RSS of the one of the first neighbouring cells is lower than the value derived from the second measurement carried out by the communications device on the first cell by greater than a threshold amount. For example, consider the case where:

- The UE performed RSS-RSRP measurements (of course in other examples this could be RSS-RSRQ, CRS-RSRP or CRS-RSRQ measurements instead) on serving Cell A (−98 dBm) and neighbour Cell B (−96 dBm) based on a default number of CRS ports;
- The actual RSS-RSRP measurement for neighbour Cell B should have been −99 dBm (based on Cell B actually having 4 antenna ports, not the default number of 2 antenna ports); and
- The cell reselection hysteresis parameter=2 dB.

In this case, even though the RSS-RSRP measurement was made based on an incorrect number of CRS ports, leading to the UE re-selecting to a worse cell (neighbour cell B has RSRP=−99 dBm compared to cell A's RSRP=−98 dBm), the UE does not move back to cell A since the cell that is re-selected to (cell B) is not worse than the original cell (cell A) by an amount greater than the hysteresis value.

Once the UE obtains the actual number of CRS ports, it will store this information for future RSS measurements even when it reselects to another cell. In other words, the communications device is configured to store the number of CRS ports of the one of the first neighbouring cells to be used for future measurements using the RSS of the one of the first neighbouring cells. In some implementations of this arrangement, the UE may store the actual number of CRS ports until a predetermined timer expires.

Blacklist

In previously described arrangements of embodiments of the present technique, it is assumed that ALL detected neighbour cells are configured with RSS. However, there may be situations in which the RSS is not configured for a neighbour cell or it is not suitable, e.g. RSS is too weak causing the accuracy of the measurement to be worse than using legacy methods (e.g. with CRS). Thus, in some arrangements of embodiments of the present technique, the serving cell indicates a Blacklist of neighbour cells that the UE should not attempt to make RSS measurements on, e.g. because these Blacklisted neighbour cells do not have RSS or their RSS configurations are not suitable for accurate measurement. In other words, the communications device is configured to receive an indication of a blacklist, the blacklist comprising one or more second neighbouring cells to the first cell, wherein the communications device is not to attempt to carry out measurements using RSSs received from one of the second neighbouring cells.

In at least one such arrangement, the said Blacklist of neighbour cells contains any neighbour cell that is NOT listed in the Neighbour Cell List. Here the UE will NOT attempt to use RSS for neighbour cells that are not listed in the Neighbour Cell List. In other words, the one or more second neighbouring cells are not listed in a neighbour cell list indicated to the communications device by the wireless communications network, and the one or more first neighbouring cells are listed in the neighbour cell list.

In at least one other such arrangement, the said Blacklist is an indicator for each neighbour cell in the Neighbour Cell List. That is for each neighbour cell in the Neighbour Cell List, there is an indicator, e.g. 1 bit, to indicate whether UE should or should not use that neighbour cell's RSS for measurements. In other words, the one or more first neighbouring cells and the one or more second neighbouring cells are listed in a neighbour cell list indicated to the communications device by the wireless communications network, wherein the neighbouring cell list comprises an indicator for each neighbour cell in the neighbouring cell list indicating whether that neighbouring cell is in the blacklist or not.

An example Neighbour Cell List is shown in Table II below, where here there are 6 neighbour cells with PCIDs {210, 56, 23, 105, 98, 6} (it should be noted there can of course be more neighbour cells in the list, e.g. 32). Here, neighbour cells with PCID 210 and 105 are blacklisted, and so the UE would not bother to detect their RSS and would not use their RSS for any measurements. For the other neighbour cells that are not blacklisted {56, 23, 98, 6}, their RSS parameters (i.e. frequency location, time offset, duration, number of CRS ports, etc.) are provided and signalled to the UE, or can otherwise be derived by the UE, so that the UE can use their RSS for measurements.

TABLE II

| Neighbour Cell List with blacklisted neighbour cells | |
| --- | --- |
| Physical Cell ID | RSS Blacklist |
| 210 | Blacklisted |
| 56 | Not blacklisted |
| 23 | Not blacklisted |
| 105 | Blacklisted |
| 98 | Not blacklisted |
| 6 | Not blacklisted |

In at least one other such arrangement, any detected neighbour cells that are NOT in the neighbour cell list are blacklisted if the UE needs to use their PSS/SSS for detection. In the legacy method, the UE detects a cell by using the PSS/SSS. If RSS is available, it is possible for the UE to directly use the RSS to detect a neighbour cell. Hence, if the UE is able to detect a cell using RSS then that neighbour cell's RSS is configured or strong enough for measurement and so it is NOT in the blacklist. If the UE fails to detect a neighbour cell using the neighbour cell's RSS then it will try to detect it using PSS/SSS and so this cell is in the blacklist. In other words, the communications device is configured to determine, each time the communications device detects a neighbouring cell, whether the detected neighbouring cell can be detected by receiving an RSS from the detected neighbouring cell, or if the detected neighbouring cell can only be detected by receiving a primary synchronisation signal, PSS, or a secondary synchronisation signal, SSS, from the detected neighbouring cell, and if the detected neighbouring cell can only be detected by receiving the PSS or the SSS from the detected neighbouring cell, to add the detected neighbouring cell to the blacklist.

Connected Mode

The UE can use the RSS for a neighbour cell's measurement in IDLE Mode and also in Connected Mode. In IDLE Mode the UE has no connection with the network and so the UE needs to use a default number of CRS ports for neighbour cells NOT in the Neighbour Cell List. However, in Connected Mode it is recognised that the eNB is in communication with the UE.

In an arrangement of embodiments of the present technique, for a UE in Connected Mode, when a UE detects a neighbour cell that is NOT listed in the Neighbour Cell List, the UE (as per legacy method) reports this detected neighbour cell to the network. The network would then signal the RSS parameters for this newly detected neighbour cell to the UE. The UE can then use these RSS parameters for measurements on this neighbour. In other words, the communications device is configured, when operating in a connected mode with the wireless communications network, to transmit an indication of the one of the first neighbouring cells to the wireless communications network, and to receive an indication of one or more RSS parameters of the one of the first neighbouring cells from the wireless communications network. Here, the one or more RSS parameters of the one of the first neighbouring cells indicated by the wireless communications network comprises the number of CRS ports of the one of the first neighbouring cells.

In another arrangement of embodiments of the present technique, for UEs in Connected Mode, when a UE detects a neighbour cell that is NOT listed in the Neighbour Cell List, the UE (as per legacy methods) reports this detected neighbour cell to the network. The network would then indicate whether this newly detected neighbour cell is in the said Blacklist. In other words, the communications device is configured, when operating in a connected mode with the wireless communications network, to transmit an indication of a neighbouring cell to the wireless communications network, and to receive an indication, from the wireless communications network, of whether the neighbouring cell is one of the first neighbouring cells or whether the neighbouring cell is one of the second neighbouring cells in the blacklist. Here:

If the newly detected neighbour cell is a Blacklisted cell, the UE will not attempt to use its RSS for measurement. The network will not signal any RSS parameters for this neighbour cell; or If the newly detected neighbour cell is NOT in a Blacklisted cell, the network will signal RSS parameters of this neighbour cell to the UE. In other words, if the neighbouring cell is one of the first neighbouring cells, the communications device is configured to receive an indication of one or more RSS parameters of the neighbouring cell from the wireless communications network.

Here, the one or more RSS parameters of the neighbouring cell indicated by the wireless communications network comprises a number of CRS ports of the neighbouring cell.

In another arrangement of embodiments of the present technique, this said indication of whether a neighbour cell is blacklisted can be implicit, i.e. if the serving cell does NOT signal any RSS parameters to the UE then it is implicitly known that this neighbour cell is blacklisted and the UE does not use its RSS for measurement. In other words, the indication comprises the communications device receiving no RSS parameters of the neighbouring cell from the wireless communications network, and the communications device is configured to determine, based on the indication, that the neighbouring cell is one of the second neighbouring cells in the blacklist.

Flow Diagram Representation

Figure 8:
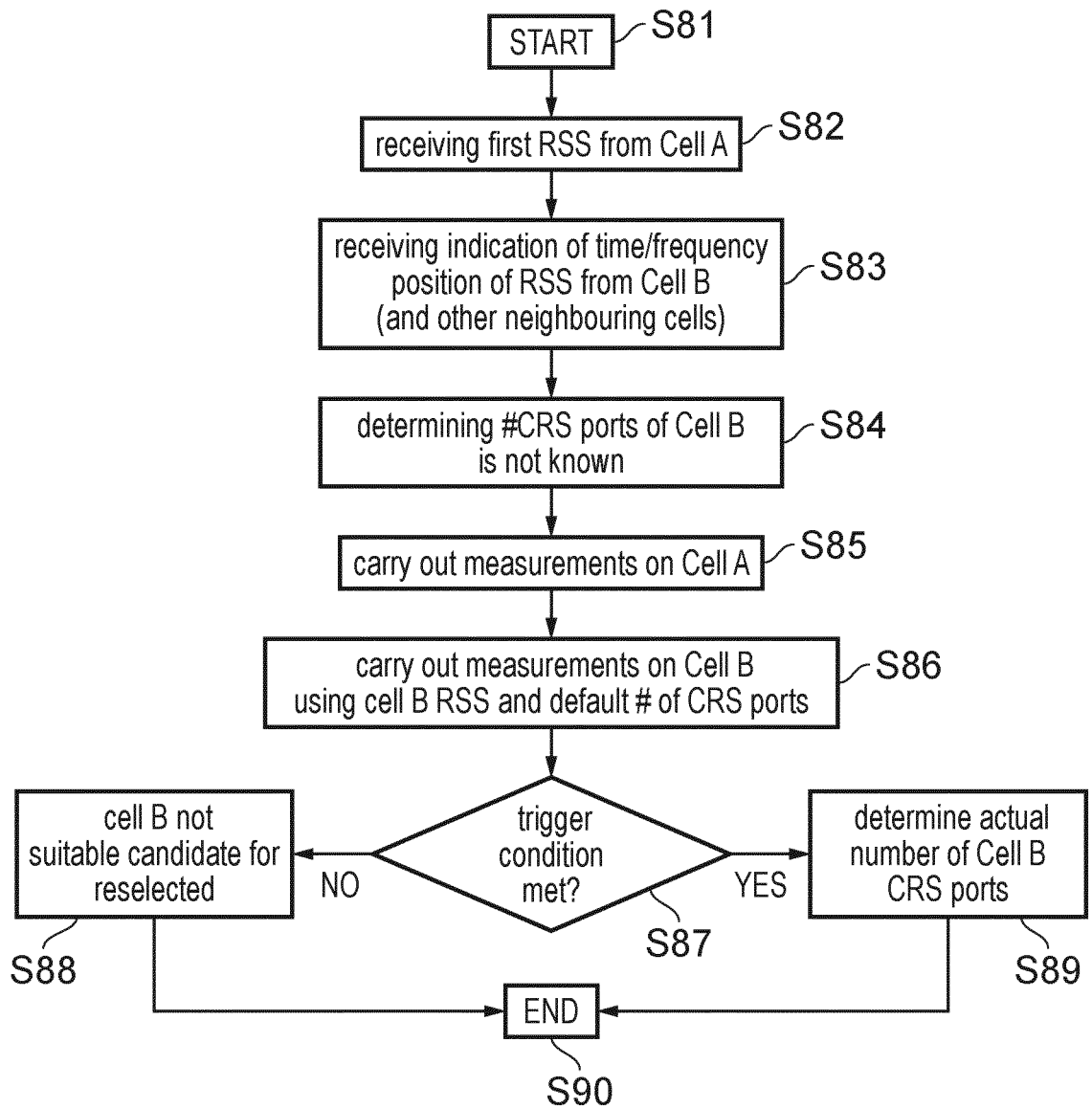
FIG. 8 shows a flow diagram illustrating a process of communications between a communications device and an infrastructure equipment in accordance with embodiments of the present technique.

FIG. 8 shows a flow diagram illustrating a method of operating a communications device in a wireless communications network, where the communications device may be for transmitting data to or receiving data from an infrastructure equipment of the wireless communications network.

The method begins in step S81. The method comprises, in step S82, receiving a first re-synchronisation signal, RSS, the first RSS being usable by the communications device for acquiring synchronisation and/or performing measurements with a first cell of a wireless communications network, shown in the flow diagram of FIG. 8 as Cell A. The process then comprises in step S83, receiving an indication of a position in time and frequency of an RSS of each of one or more first neighbouring cells to the first cell, the RSSs of each of the first neighbouring cells being usable by the communications device for acquiring synchronisation and/or performing measurements with the each of the first neighbouring cells. In step S84, the process involves determining that a number of cell-specific reference signal, CRS, ports of one of the first neighbouring cells, shown in the flow diagram of FIG. 8 as Cell B, is not known by the communications device. The method then involves, in step S85, carrying out a measurement on the first cell, and in step S86, carrying out a measurement using the RSS of the one of the neighbouring cells, wherein the measurement of step S86 is carried out using the RSS of the one of the neighbouring cells in accordance with a default number of CRS ports. The method then involves, in step S87, determining, if a trigger condition has been met. If the trigger condition has not been met, then the method comprises, in step S88, determining that the one of the first neighbouring cells is not a suitable candidate cell for reselection by the communications device. The communications device here would no longer be interested in the one of the neighbouring cells, and would not store information relating to its assumed number of CRS ports, etc. If the trigger condition has been met however, then the process comprises, in step S89, determining the actual number of CRS ports of the one of the first neighbouring cells. This actual number of CRS ports may then be used by the communications device to measure the RSS-RSRP/RSS-RSRQ of the neighbouring cell. The process ends in step S90.

Those skilled in the art would appreciate that the method shown by FIG. 8 may be adapted in accordance with embodiments of the present technique. For example, other preliminary, intermediate, or subsequent steps as described herein may be included in the method, or the steps may be performed in any logical order.

Though embodiments of the present technique have been described largely by way of the example communications system shown in FIG. 6, it would be clear to those skilled in the art that they could be equally applied to other systems to those described herein. Furthermore, to the extent that the various arrangements described herein are described individually, these can be combined with any other arrangement described herein providing the two do not contradict one another.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A communications device configured to transmit signals to or receive signals from a wireless communications network, the communications device comprising transceiver circuitry configured to transmit signals to and receive signals from the wireless communications network, and controller circuitry configured in combination with the transceiver circuitry to receive a first re-synchronisation signal, RSS, the first RSS being usable by the communications device for acquiring synchronisation and/or performing measurements with a first cell of the wireless communications network, to receive an indication of a position in time and frequency of an RSS of each of one or more first neighbouring cells to the first cell, the RSSs of each of the first neighbouring cells being usable by the communications device for acquiring synchronisation and/or performing measurements with the each of the first neighbouring cells, to determine that a number of cell-specific reference signal, CRS, ports of one of the first neighbouring cells is not known by the communications device, to carry out a measurement on the first cell, to carry out a measurement using the RSS of the one of the neighbouring cells, wherein the measurement is carried out using the RSS of the one of the neighbouring cells in accordance with a default number of CRS ports, and to determine, if a trigger condition has not been met, that the one of the first neighbouring cells is not a suitable candidate cell for reselection by the communications device.

Paragraph 2. A communications device according to Paragraph 1, wherein the default number of CRS ports is predetermined and known to the communications device.

Paragraph 3. A communications device according to Paragraph 1 or Paragraph 2, wherein the communications device is configured to receive signalling information comprising an indication of the default number of CRS ports.

Paragraph 4. A communications device according to any of Paragraphs 1 to 3, wherein the default number of CRS ports is equal to a number of CRS ports of the first cell.

Paragraph 5. A communications device according to any of Paragraphs 1 to 4, wherein the trigger condition is met when a value derived from the measurement carried out by the communications device using the RSS of the one of the first neighbouring cells is greater than a value derived from the measurement carried out by the communications device on the first cell by greater than a threshold amount.

Paragraph 6. A communications device according to any of Paragraphs 1 to 5, wherein the trigger condition is met when a value derived from the measurement carried out by the communications device using the RSS of the one of the first neighbouring cells is greater than a threshold amount.

Paragraph 7. A communications device according to any of Paragraphs 1 to 6, wherein the trigger condition is met when a value derived from the measurement carried out by the communications device using the RSS of the one of the first neighbouring cells is lower than a threshold amount.

Paragraph 8. A communications device according to any of Paragraphs 1 to 7, wherein the trigger condition is met when a value derived from the measurement carried out by the communications device on the first cell is lower than a threshold amount.

Paragraph 9. A communications device according to any of Paragraphs 1 to 8, wherein the communications device is configured to reselect, if the trigger condition has been met, to the one of the first neighbouring cells such that the communications device receives signals from the one of the first neighbouring cells instead of the first cell, and to determine the number of CRS ports of the one of the first neighbouring cells.

Paragraph 10. A communications device according to Paragraph 9, wherein the determining the number of CRS ports of the one of the first neighbouring cells comprises the communications device being configured to determine the number of CRS ports of the one of the first neighbouring cells by reading system information broadcasted by the one of the first neighbouring cells.

Paragraph 11. A communications device according to Paragraph 9 or Paragraph 10, wherein the determining the number of CRS ports of the one of the first neighbouring cells comprises the communications device being configured to carry out a measurement of a strength of signals received from the one of the first neighbouring cells using a first method, to carry out a measurement of a strength of the signals received from the one of the first neighbouring cells using a second method that is different to the first method, and to determine the number of CRS ports of the one of the first neighbouring cells based on the difference between the strength measured using the first method and the strength measured using the second method.

Paragraph 12. A communications device according to Paragraph 11, wherein the first method involves carrying out the measurement using CRS signals received from the one of the first neighbouring cells and wherein the second method involves carrying out the measurement using the RSS of the one of the first neighbouring cells.

Paragraph 13. A communications device according to Paragraph 11 or Paragraph 12, wherein if the strength measured using the first method is greater than the strength measured using the second method by a first threshold amount, the communications device is configured to determine the number of CRS ports of the one of the first neighbouring cells by halving the default number of CRS ports.

Paragraph 14. A communications device according to Paragraph 13, wherein if the strength measured using the first method is greater than the strength measured using the second method by a second threshold amount, the second threshold amount being greater than the first threshold amount, the communications device is configured to determine the number of CRS ports of the one of the first neighbouring cells by quartering the default number of CRS ports.

Paragraph 15. A communications device according to Paragraph 11 or Paragraph 12, wherein if the strength measured using the first method is lower than the strength measured using the second method by a third threshold amount, the communications device is configured to determine the number of CRS ports of the one of the first neighbouring cells by doubling the default number of CRS ports.

Paragraph 16. A communications device according to Paragraph 15, wherein if the strength measured using the first method is lower than the strength measured using the second method by a fourth threshold amount, the fourth threshold amount being greater than the third threshold amount, the communications device is configured to determine the number of CRS ports of the one of the first neighbouring cells by quadrupling the default number of CRS ports.

Paragraph 17. A communications device according to Paragraph 11 or Paragraph 12, wherein if the absolute difference between the strength measured using the first method and the strength measured using the second method is below a fifth threshold amount, the communications device is configured to determine that the number of CRS ports of the one of the first neighbouring cells is equal to the default number of CRS ports.

Paragraph 18. A communications device according to any of Paragraphs 9 to 17, wherein the determining the number of CRS ports of the one of the first neighbouring cells comprises the communications device being configured
  to detect CRS signals received from the one of the first neighbouring cells, each of the CRS signals being associated with one of the CRS ports.

Paragraph 19. A communications device according to any of Paragraphs 9 to 18, wherein the communications device is configured
  to determine that the trigger condition was met because the default number of CRS ports in accordance with which the measurement was carried out by the communications device using the RSS of the one of the first neighbouring cells is not equal to the number of CRS ports of the one of the neighbouring cells,
  to determine that a value derived from a second measurement carried out by the communications device using the RSS of the one of the neighbouring cells and in accordance with the number of CRS ports of the one of the neighbouring cells is lower than a value derived from the measurement carried out by the communications device on the first cell, and
  to reselect to the first cell such that the communications device receives signals from the first cell instead of the one of the first neighbouring cells.

Paragraph 20. A communications device according to Paragraph 19, wherein the communications device is configured to reselect to the first cell only if the value derived from the second measurement carried out by the communications device using the RSS of the one of the first neighbouring cells is lower than the value derived from the second measurement carried out by the communications device on the first cell by greater than a threshold amount.

Paragraph 21. A communications device according to any of Paragraphs 9 to 20, wherein the communications device is configured to store the number of CRS ports of the one of the first neighbouring cells to be used for future measurements using the RSS of the one of the first neighbouring cells.

Paragraph 22. A communications device according to Paragraph 21, wherein the communications device is configured to store the number of CRS ports of the one of the first neighbouring cells only until a predetermined timer has expired.

Paragraph 23. A communications device according to any of Paragraphs 1 to 22, wherein the communications device is configured
  to receive an indication of a blacklist, the blacklist comprising one or more second neighbouring cells to the first cell, wherein the communications device is not to attempt to carry out measurements using RSSs received from one of the second neighbouring cells.

Paragraph 24. A communications device according to Paragraph 23, wherein the one or more second neighbouring cells are not listed in a neighbour cell list indicated to the communications device by the wireless communications network, and the one or more first neighbouring cells are listed in the neighbour cell list.

Paragraph 25. A communications device according to Paragraph 23 or Paragraph 24, wherein the one or more first neighbouring cells and the one or more second neighbouring cells are listed in a neighbour cell list indicated to the communications device by the wireless communications network, wherein the neighbouring cell list comprises an indicator for each neighbouring cell in the neighbouring cell list indicating whether that neighbouring cell is in the blacklist or not.

Paragraph 26. A communications device according to any of Paragraphs 23 to 25, wherein the communications device is configured
  to determine, each time the communications device detects a neighbouring cell, whether the detected neighbouring cell can be detected by receiving an RSS from the detected neighbouring cell, or if the detected neighbouring cell can only be detected by receiving a primary synchronisation signal, PSS, or a secondary synchronisation signal, SSS, from the detected neighbouring cell, and if the detected neighbouring cell can only be detected by receiving the PSS or the SSS from detected neighbouring cell,
  to add the detected neighbouring cell to the blacklist.

Paragraph 27. A communications device according to any of Paragraphs 1 to 26, wherein the communications device is configured, when operating in a connected mode with the wireless communications network,
  to transmit an indication of the one of the first neighbouring cells to the wireless communications network, and
  to receive an indication of one or more RSS parameters of the one of the first neighbouring cells from the wireless communications network.

Paragraph 28. A communications device according to Paragraph 27, wherein the one or more RSS parameters of the one of the first neighbouring cells indicated by the wireless communications network comprises the number of CRS ports of the one of the first neighbouring cells.

Paragraph 29. A communications device according to any of Paragraphs 23 to 28, wherein the communications device is configured, when operating in a connected mode with the wireless communications network,
  to transmit an indication of a neighbouring cell to the wireless communications network, and
  to receive an indication, from the wireless communications network, of whether the neighbouring cell is one of the first neighbouring cells or whether the neighbouring cell is one of the second neighbouring cells in the blacklist.

Paragraph 30. A communications device according to Paragraph 29, wherein if the neighbouring cell is one of the first neighbouring cells, the communications device is configured
  to receive an indication of one or more RSS parameters of the neighbouring cell from the wireless communications network.

Paragraph 31. A communications device according to Paragraph 30, wherein the one or more RSS parameters of the neighbouring cell indicated by the wireless communications network comprises a number of CRS ports of the neighbouring cell.

Paragraph 32. A communications device according to any of Paragraphs 29 to 31, wherein the indication comprises the communications device receiving no RSS parameters of the neighbouring cell from the wireless communications network, and the communications device is configured to determine, based on the indication, that the neighbouring cell is one of the second neighbouring cells in the blacklist.

Paragraph 33. A communications device according to any of Paragraphs 1 to 32, wherein the communications device is configured to carry out the measurement on the first cell using the first RSS.

Paragraph 34. A communications device according to any of Paragraphs 1 to 33, wherein the communications device is configured to carry out the measurement on the first cell using CRS signals received from the first cell.

Paragraph 35. A communications device according to any of Paragraphs 1 to 34, wherein the measurements carried out on the first cell and/or the measurements carried out using the RSS of the one of the neighbouring cells are Reference Signal Received Power, RSRP, measurements.

Paragraph 36. A communications device according to any of Paragraphs 1 to 35, wherein the measurements carried out on the first cell and/or the measurements carried out using the RSS of the one of the neighbouring cells are Reference Signal Received Quality, RSRQ, measurements.

Paragraph 37. A method of operating a communications device, the method comprising
- receiving a first re-synchronisation signal, RSS, the first RSS being usable by the communications device for acquiring synchronisation and/or performing measurements with a first cell of a wireless communications network,
- receiving an indication of a position in time and frequency of an RSS of each of one or more first neighbouring cells to the first cell, the RSSs of each of the first neighbouring cells being usable by the communications device for acquiring synchronisation and/or performing measurements with the each of the first neighbouring cells,
- determining that a number of cell-specific reference signal, CRS, ports of one of the first neighbouring cells is not known by the communications device,
- carrying out a measurement on the first cell,
- carrying out a measurement using the RSS of the one of the neighbouring cells, wherein the measurement is carried out using the RSS of the one of the neighbouring cells in accordance with a default number of CRS ports, and
- determining, if a trigger condition has not been met, that the one of the first neighbouring cells is not a suitable candidate cell for reselection by the communications device.

Paragraph 38. Circuitry for a communications device configured to transmit signals to or receive signals from a wireless communications network, the communications device comprising
- transceiver circuitry configured to transmit signals to and receive signals from the wireless communications network, and
- controller circuitry configured in combination with the transceiver circuitry
- to receive a first re-synchronisation signal, RSS, the first RSS being usable by the communications device for acquiring synchronisation and/or performing measurements with a first cell of the wireless communications network,
- to receive an indication of a position in time and frequency of an RSS of each of one or more first neighbouring cells to the first cell, the RSSs of each of the first neighbouring cells being usable by the communications device for acquiring synchronisation and/or performing measurements with the each of the first neighbouring cells,
- to determine that a number of cell-specific reference signal, CRS, ports of one of the first neighbouring cells is not known by the communications device,
- to carry out a measurement on the first cell,
- to carry out a measurement using the RSS of the one of the neighbouring cells, wherein the measurement is carried out using the RSS of the one of the neighbouring cells in accordance with a default number of CRS ports, and
- to determine, if a trigger condition has not been met, that the one of the first neighbouring cells is not a suitable candidate cell for reselection by the communications device.

Paragraph 39. An infrastructure equipment forming part of a wireless communications network and operating a first cell of the wireless communications network, the infrastructure equipment being configured to transmit signals to or receive signals from a communications device, the infrastructure equipment comprising
- transceiver circuitry configured to transmit signals to and receive signals from the communications device, and
- controller circuitry configured in combination with the transceiver circuitry
- to transmit, to the communications device, a first re-synchronisation signal, RSS, the first RSS being configured to carry information which is detectable by the communications device for acquiring synchronisation with the first cell of the wireless communications network,
- to transmit, to the communications device, an indication of a position in time and frequency of an RSS of each of one or more first neighbouring cells to the first cell, the RSSs of each of the first neighbouring cells being configured to carry information which is detectable by the communications device for acquiring synchronisation and/or performing measurements with the each of the first neighbouring cells, and
- to transmit, to the communications device, an indication of a default number of CRS ports.

Paragraph 40. An infrastructure equipment forming part of a wireless communications network and operating a first cell of the wireless communications network, the infrastructure equipment being configured to transmit signals to or receive signals from a communications device, the infrastructure equipment comprising
- transceiver circuitry configured to transmit signals to and receive signals from the communications device, and
- controller circuitry configured in combination with the transceiver circuitry
- to transmit, to the communications device, a first re-synchronisation signal, RSS, the first RSS being configured to carry information which is detectable by the communications device for acquiring synchronisation with the first cell of the wireless communications network,
- to transmit, to the communications device, an indication of a position in time and frequency of an RSS of each of one or more first neighbouring cells to the first cell, the RSSs of each of the first neighbouring cells being configured to carry information which is detectable by the communications device for acquiring synchronisation and/or performing measurements with the each of the first neighbouring cells, and to transmit, to the communications device, an indication of a blacklist, the blacklist comprising one or more second neighbouring cells to the first cell, wherein the communications device is not to attempt to carry out measurements on RSSs received from one of the second neighbouring cells.

Paragraph 41. An infrastructure equipment according to Paragraph 40, wherein the one or more second neighbouring cells are not listed in a neighbour cell list indicated to the communications device by the infrastructure equipment, and the one or more first neighbouring cells are listed in the neighbour cell list.

Paragraph 42. An infrastructure equipment according to Paragraph 40 or Paragraph 41, wherein the one or more first neighbouring cells and the one or more second neighbouring cells are listed in a neighbour cell list indicated to the communications device by the infrastructure equipment, wherein the neighbouring cell list comprises an indicator for each neighbouring cell in the neighbouring cell list indicating whether that neighbouring cell is in the blacklist or not.

Paragraph 43. An infrastructure equipment according to any of Paragraphs 40 to 42, wherein the infrastructure equipment is configured, when the communications device is operating in a connected mode with the wireless communications network, to receive an indication of a neighbouring cell from the communications device, and to transmit, to the communications device, an indication of whether the neighbouring cell is one of the first neighbouring cells or whether the neighbouring cell is one of the second neighbouring cells in the blacklist.

Paragraph 44. An infrastructure equipment according to Paragraph 43, wherein if the neighbouring cell is one of the first neighbouring cells, the infrastructure equipment is configured to transmit an indication of one or more RSS parameters of the neighbouring cell to the communications device.

Paragraph 45. An infrastructure equipment according to Paragraph 44, wherein the one or more RSS parameters of the neighbouring cell comprises a number of CRS ports of the neighbouring cell Paragraph 46. An infrastructure equipment forming part of a wireless communications network and operating a first cell of the wireless communications network, the infrastructure equipment being configured to transmit signals to or receive signals from a communications device, the infrastructure equipment comprising transceiver circuitry configured to transmit signals to and receive signals from the communications device, and controller circuitry configured in combination with the transceiver circuitry to transmit, to the communications device, a first re-synchronisation signal, RSS, the first RSS being configured to carry information which is detectable by the communications device for acquiring synchronisation with the first cell of the wireless communications network, to transmit, to the communications device, an indication of a position in time and frequency of an RSS of each of one or more first neighbouring cells to the first cell, the RSSs of each of the first neighbouring cells being configured to carry information which is detectable by the communications device for acquiring synchronisation and/or performing measurements with the each of the first neighbouring cells, and, when the communications device is operating in a connected mode with the wireless communications network, to receive an indication of one of the first neighbouring cells from the communications device, and to transmit an indication of one or more RSS parameters of the one of the first neighbouring cells to the communications device.

Paragraph 47. An infrastructure equipment according to Paragraph 46, wherein the one or more RSS parameters of the one of the first neighbouring cells comprises the number of CRS ports of the one of the first neighbouring cells.

Paragraph 48. A method of operating an infrastructure equipment forming part of a wireless communications network and operating a first cell of the wireless communications network, the method comprising transmitting, to a communications device, a first re-synchronisation signal, RSS, the first RSS being configured to carry information which is detectable by the communications device for acquiring synchronisation with the first cell of the wireless communications network, transmitting, to the communications device, an indication of a position in time and frequency of an RSS of each of one or more first neighbouring cells to the first cell, the RSSs of each of the first neighbouring cells being configured to carry information which is detectable by the communications device for acquiring synchronisation and/or performing measurements with the each of the first neighbouring cells, and transmitting, to the communications device, an indication of a default number of CRS ports.

Paragraph 49. Circuitry for an infrastructure equipment forming part of a wireless communications network and operating a first cell of the wireless communications network, the infrastructure equipment being configured to transmit signals to or receive signals from a communications device, the infrastructure equipment comprising transceiver circuitry configured to transmit signals to and receive signals from the communications device, and controller circuitry configured in combination with the transceiver circuitry to transmit, to the communications device, a first re-synchronisation signal, RSS, the first RSS being configured to carry information which is detectable by the communications device for acquiring synchronisation with the first cell of the wireless communications network, to transmit, to the communications device, an indication of a position in time and frequency of an RSS of each of one or more first neighbouring cells to the first cell, the RSSs of each of the first neighbouring cells being configured to carry information which is detectable by the communications device for acquiring synchronisation and/or performing measurements with the each of the first neighbouring cells, and to transmit, to the communications device, an indication of a default number of CRS ports.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] RP-161464, "Revised WID for Further Enhanced MTC for LTE," Ericsson, RAN #73.
[2] RP-161901, "Revised work item proposal: Enhancements of NB-IoT", Huawei, HiSilicon, RAN #73.
[3] RP-170732, "New WID on Even further enhanced MTC for LTE," Ericsson, Qualcomm, RAN #75.
[4] RP-170852, "New WID on Further NB-IoT enhancements," Huawei, HiSilicon, Neul, RAN #75.
[5] RP-181450, "New WID on Rel-16 MTC enhancements for LTE," Ericsson, RAN #80.
[6] RP-181451, "New WID on Rel-16 enhancements for NB-IoT," Ericsson, Huawei, RAN #80.
[7] Holma H. and Toskala A, "LTE for UMTS OFDMA and SC-FDMA based radio access", John Wiley and Sons, 2009.
[8] White Paper "Coverage Analysis of LTE-M Category-M1" Sierra Wireless, Ericsson, Altair, Sony, Virtuosys, AT&T, Verizon, Sequans, Orange, KDDI, Nokia, DoCoMo, KT, SoftBank, Telkomsel, SK Telecom, 2016.
[9] 3GPP TS 36.211, "E-UTRA: Physical channels and modulation" v15.6.0.
[10] 3GPP TS 36.214, "E-UTRA: Physical layer; Measurements," v15.3.0.
[11] R1-1908026, "Use of RSS for measurement improvements in LTE-MTC," Ericsson, RAN1 #98.

What is claimed is:

1. A communications device configured to transmit signals to or receive signals from a wireless communications network, the communications device comprising
   transceiver circuitry configured to transmit signals to and receive signals from the wireless communications network, and
   controller circuitry configured in combination with the transceiver circuitry to
      receive a first re-synchronisation signal (RSS), the first RSS being usable by the communications device for acquiring synchronisation and/or performing measurements with a first cell of the wireless communications network,
      receive an indication of a position in time and frequency of an RSS of each of a plurality of first neighboring cells to the first cell, the RSSs of each of the plurality of the first neighboring cells being usable by the communications device for acquiring synchronisation and/or performing measurements with the each of the plurality of the first neighboring cells,
      determine that a number of cell-specific reference signal (CRS) ports of one of the plurality of the first neighboring cells is not known by the communications device,
      carry out a measurement on the first cell,
      carry out a measurement using the RSS of the one of the plurality of the first neighboring cells, wherein the measurement is carried out using the RSS of the one of the plurality of the first neighboring cells in accordance with a default number of CRS ports, and
      determine, when a trigger condition has not been met, that the one of the plurality of the first neighboring cells is not a suitable candidate cell for reselection by the communications device.

2. The communications device according to claim 1, wherein the default number of CRS ports is predetermined and known to the communications device.

3. The communications device according to claim 1, wherein the communications device is configured to receive signalling information comprising an indication of the default number of CRS ports.

4. The communications device according to claim 1, wherein the default number of CRS ports is equal to a number of CRS ports of the first cell.

5. The communications device according to claim 1, wherein the trigger condition is met when a value derived from the measurement carried out by the communications device using the RSS of the one of the plurality of the first neighboring cells is greater than a value derived from the measurement carried out by the communications device on the first cell by greater than a threshold amount.

6. The communications device according to claim 1, wherein the trigger condition is met when a value derived from the measurement carried out by the communications device using the RSS of the one of the plurality of the first neighboring cells is greater than a threshold amount.

7. The communications device according to claim 1, wherein the trigger condition is met when a value derived from the measurement carried out by the communications device using the RSS of the one of the plurality of the first neighboring cells is lower than a threshold amount.

8. The communications device according to claim 1, wherein the trigger condition is met when a value derived from the measurement carried out by the communications device on the first cell is lower than a threshold amount.

9. The communications device according to claim 1, wherein the communications device is configured to:
   reselect, when the trigger condition has been met, to the one of the plurality of the first neighboring cells such that the communications device receives signals from the one of the plurality of the first neighboring cells instead of the first cell, and
   determine a number of CRS ports of the one of the plurality of the first neighboring cells.

10. The communications device according to claim 9, wherein the determining the number of CRS ports of the one of the plurality of the first neighboring cells comprises the communications device being configured to determine the number of CRS ports of the one of the plurality of the first neighboring cells by reading system information broadcasted by the one of the plurality of the first neighboring cells.

11. The communications device according to claim 9, wherein the determining the number of CRS ports of the one of the plurality of the first neighboring cells comprises the communications device being configured to:
- carry out a measurement of a strength of signals received from the one of the plurality of the first neighboring cells using a first method,
- carry out a measurement of a strength of the signals received from the one of the plurality of the first neighboring cells using a second method that is different to the first method, and
- determine the number of CRS ports of the one of the plurality of the first neighboring cells based on the difference between the strength measured using the first method and the strength measured using the second method.

12. The communications device according to claim 11, wherein the first method involves carrying out the measurement using CRS signals received from the one of the plurality of the first neighboring cells and wherein the second method involves carrying out the measurement using the RSS of the one of the plurality of the first neighboring cells.

13. The communications device according to claim 11, wherein when the strength measured using the first method is greater than the strength measured using the second method by a first threshold amount, the communications device is configured to determine the number of CRS ports of the one of the plurality of the first neighboring cells by halving the default number of CRS ports.

14. The communications device according to claim 13, wherein when the strength measured using the first method is greater than the strength measured using the second method by a second threshold amount, the second threshold amount being greater than the first threshold amount, the communications device is configured to determine the number of CRS ports of the one of the plurality of the first neighboring cells by quartering the default number of CRS ports.

15. The communications device according to claim 11, wherein when the strength measured using the first method is lower than the strength measured using the second method by a third threshold amount, the communications device is configured to determine the number of CRS ports of the one of the plurality of the first neighboring cells by doubling the default number of CRS ports.

16. The communications device according to claim 15, wherein when the strength measured using the first method is lower than the strength measured using the second method by a fourth threshold amount, the fourth threshold amount being greater than the third threshold amount, the communications device is configured to determine the number of CRS ports of the one of the plurality of the first neighboring cells by quadrupling the default number of CRS ports.

17. The communications device according to claim 1, wherein the communications device is configured to receive an indication of a blacklist, the blacklist comprising at least one of a plurality of second neighboring cells to the first cell, wherein the communications device is not to attempt to carry out measurements using RSSs received from one of the plurality of the second neighboring cells.

18. The communications device according to claim 1, wherein the communications device is configured, when operating in a connected mode with the wireless communications network, to:
- transmit an indication of the one of the plurality of the first neighboring cells to the wireless communications network, and
- receive an indication of one or more RSS parameters of the one of the plurality of the first neighboring cells from the wireless communications network.

19. A method of operating a communications device, the method comprising:
- receiving a first re-synchronisation signal (RSS), the first RSS being usable by the communications device for acquiring synchronisation and/or performing measurements with a first cell of a wireless communications network,
- receiving an indication of a position in time and frequency of an RSS of each of a plurality of first neighboring cells to the first cell, the RSSs of each of the plurality of the first neighboring cells being usable by the communications device for acquiring synchronisation and/or performing measurements with the each of the plurality of the first neighboring cells,
- determining that a number of cell-specific reference signal (CRS) ports of one of the plurality of the first neighboring cells is not known by the communications device,
- carrying out a measurement on the first cell,
- carrying out a measurement using the RSS of the one of the plurality of the first neighboring cells, wherein the measurement is carried out using the RSS of the one of the plurality of the first neighboring cells in accordance with a default number of CRS ports,
- determining whether a trigger condition has not been met, and
- determining, that the one of the plurality of the first neighboring cells is not a suitable candidate cell for reselection by the communications device in response to determining that the trigger condition has not been met.

20. An infrastructure equipment forming part of a wireless communications network and operating a first cell of the wireless communications network, the infrastructure equipment being configured to transmit signals to or receive signals from a communications device, the infrastructure equipment comprising
- transceiver circuitry configured to transmit signals to and receive signals from the communications device, and
- controller circuitry configured in combination with the transceiver circuitry to
- transmit, to the communications device, a first re-synchronisation signal (RSS), the first RSS being configured to carry information which is detectable by the communications device for acquiring synchronisation with the first cell of the wireless communications network,
- transmit, to the communications device, an indication of a position in time and frequency of an RSS of each of a plurality of first neighboring cells to the first cell, the RSSs of each of the plurality of the first neighboring cells being configured to carry information which is detectable by the communications device for acquiring synchronisation and/or performing measurements with the each of the plurality of the first neighboring cells, and
- transmit, to the communications device, an indication of a default number of cell-specific reference signal (CRS) ports.

* * * * *